April 2, 1935.  C. D. ECKHART  1,996,285
BLOW-OUT PATCH FOR PNEUMATIC TIRES
Filed Aug. 3, 1934
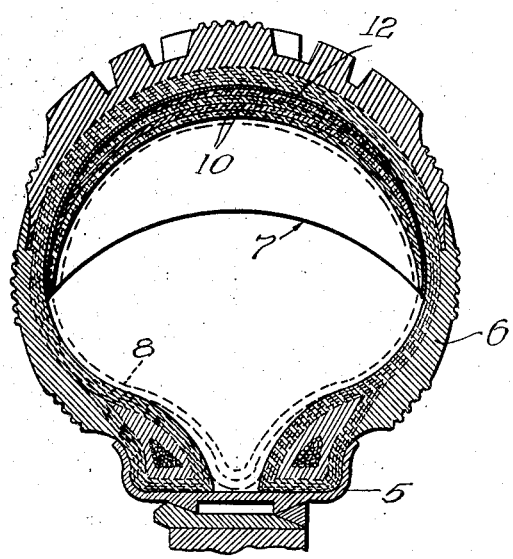
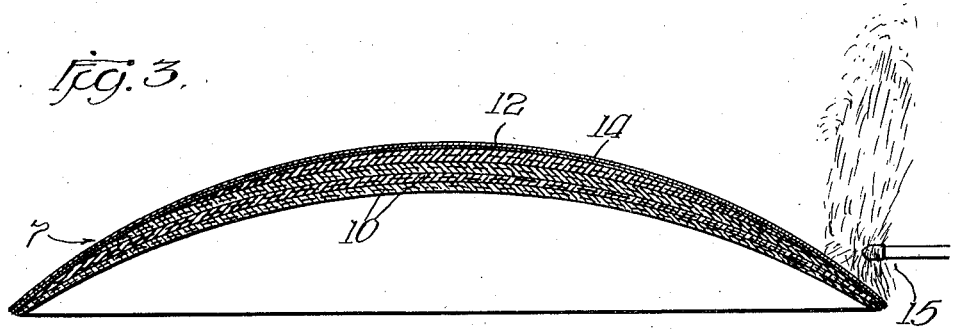
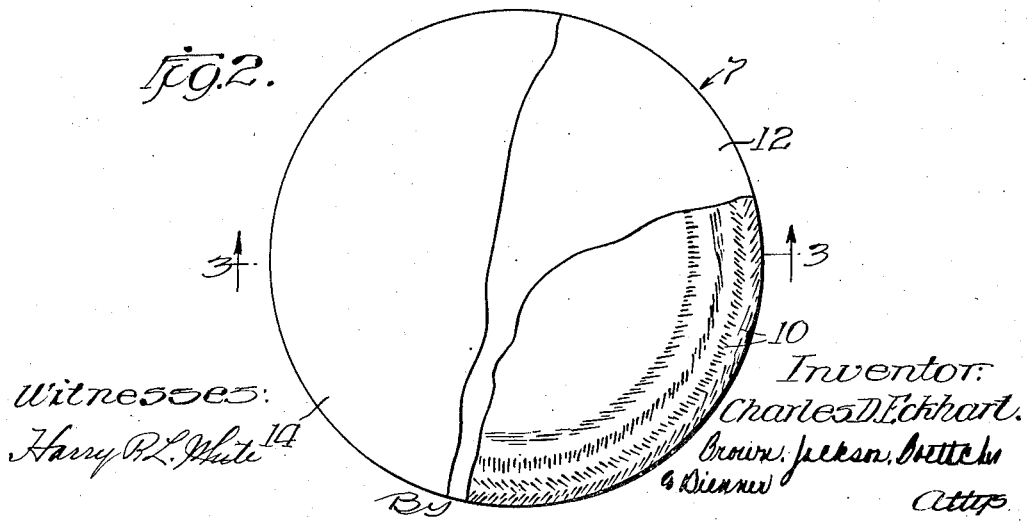
Inventor:
Charles D. Eckhart.

Patented Apr. 2, 1935

1,996,285

UNITED STATES PATENT OFFICE 1,996,285

BLOW-OUT PATCH FOR PNEUMATIC TIRES

Charles D. Eckhart, Chicago, Ill., assignor to Dean Hole, Winnetka, Ill.

Application August 3, 1934, Serial No. 738,269

6 Claims. (Cl. 152—26)

The present invention relates to what are commonly known as blow-out patches or tire shoes used for strengthening the outer casings of pneumatic tires when the same become perforated by a blow-out or cut, or become weakened from other causes. Such tire patches are usually cemented to the inner wall of the tire casing so as to lie between the casing and the inner tube to cover the opening or weakened portion in the casing, whereby the tube, when inflated, is prevented from working into such opening or weakened portion.

Many such inside blow-out patches have been devised in the past, but they have been found to be objectionable for various reasons. With the patches that have had a coating of suitable adhesive or cement applied to the outer surface with a sheet of "Cellophane" or equivalent protective material, covering the adhesive coating to protect and maintain this coating in proper condition until the patch is used, the adhesive could not be tacky enough to secure and hold the patch to the casing in fixed relation because, if it were, it would be difficult, if not impossible, to remove the protective coverings previously proposed. These coverings have commonly been peeled or stripped off when the patch is to be used, and if the adhesive is too tacky the covering tears and must be removed piecemeal, which requires time and labor. And if the adhesive is not sufficiently tacky, there is a tendency for the patch, when applied to the casing of the tire, to creep along the casing from the position in which it is originally placed, because relative motion in one direction is usually set up between the casing patch and the inner tube upon rotation of the vehicle wheel upon the road.

To overcome the defect of insecure attachment to the casing of the tire, many expedients have been proposed, such as providing fastening devices of various types in addition to the adhesive cement for holding the patch in place, but such devices have been somewhat complicated and expensive to manufacture, and have not been such as are easily and quickly applied to the casing as is desirable when making repairs on the road. Vacuum cups have also been proposed, but they make the devices more complicated and expensive to manufacture.

With the above noted objections in mind, my invention has for its principal object to provide a blow-out patch which may be easily and quickly secured in position to the casing of the tire and which will be held against creeping from such position when the casing is in use on a wheel, all without the use of vacuum cups or extraneous devices for that purpose, and by the simple expedient of a better and more tacky cement.

A further object of the invention is to provide a blow-out patch having a coating of suitable adhesive or cement and a covering of readily inflammable material, such as collodion, or any chemical or other substance which will afford the desired protection for the adhesive coating until the patch is used, and which is sufficiently inflammable to be removed by applying a match or other suitable flame thereto.

With a readily inflammable covering of this sort for the adhesive coating, the problem of peeling or stripping off a sheet of "Cellophane", or equivalent material which is not readily inflammable, is overcome, and the adhesive coating may be more tacky than heretofore possible without rendering more difficult, if not impossible, the removal of the covering for the adhesive coating. The use of a readily inflammable covering for this coating until the patch is used and the burning off of this covering by application of a match or other flame thereto has a further advantage, namely, the heat which is produced in burning off this covering heats the adhesive coating and brings it to a more tacky and better condition for adhesion to the casing of the tire. As a result, a regular vulcanizing cement, such as requires some heat to make it sufficiently tacky for use may be employed, and better adhesion to the casing of the tire is secured.

Other advantageous features will be apparent from the following description of the invention, taken in connection with the accompanying drawing, in which:

Figure 1 is a cross-sectional view illustrating a tire casing mounted on a wheel rim, with my improved blow-out patch secured in position therein;

Figure 2 is a top plan view of the blow-out patch; and

Figure 3 is an enlarged cross-sectional view through the patch, taken on the line 3—3 of Figure 2 and showing the manner of applying a match or other flame for the purpose of burning the protective covering from the adhesive coating.

Referring to the drawing, the wheel rim is indicated at 5, the tire casing at 6, and the blow-out patch in its entirety at 7. The inner tube of the pneumatic tire is shown in dotted lines at 8 in Figure 1.

The blow-out patch, as a whole, is a disc, preferably of concavo-convex form, whereby it will readily conform to the inner surface of the tire casing 6. The patch illustrated in the drawing is substantially circular, but it may be oval or of any other desired configuration.

The details of the main body portion of the patch may vary widely within the scope of the present invention, it being understood that the invention may be used with any patch or equivalent device of the usual or any suitable or preferred construction. The patch shown in the drawing is of cord construction, but it may be built up in layers or formed in any other suitable or preferred manner. The following description of the body of the patch shown in the drawing is illustrative and not limiting.

In the illustrated embodiment of the invention, the main body portion of the patch, indicated at 10, is of the usual cord construction, such as are formed of old automobile tire casings. These casings are commonly run through a slitting machine which takes off the remaining tread and leaves a strip of cord fabric. This strip of cord fabric is die-cut to the desired shapes such, for example, as the shape illustrated in Figure 2. The upper marginal portion of the body 10 of the patch 7 is skived or beveled so that no appreciable shoulder will be formed between the inner wall of the casing and the outer surface of the patch which might tend to pinch or otherwise injure the inner tube.

The entire convex upper surface of the patch body 10 has applied thereto a coating 12 of suitable adhesive or cement. This adhesive or cement is preferably the regular vulcanizing cement, such as requires at least some heat to bring it to the desired tacky condition, although other adhesives or cements are contemplated within the scope of the present invention. This adhesive coating 12 is preferably applied to the upper surface of the patch body 10 in the manufacture of the patch, and a covering 14 is applied over the adhesive or cement coating 12 to preserve such adhesive coating in proper condition, and to prevent adhesion of the patch to another patch or to other articles until the patch is ready for use.

The covering 14 is of any readily inflammable chemical or other substance, such as collodion, which, as well understood in the art, is a solution of gun-cotton or pyroxylin in ether and alcohol. This covering 14 may be applied by spraying or painting it over the entire upper adhesive coated surface 12 of the patch 7, or in any other suitable or preferred manner. For example, where the readily inflammable covering is of celluloid-like material, or other readily inflammable sheet material, it may be applied over the upper adhesive coated surface 12 of the patch 7 in sheet form.

The inflammability rating of cellophane, the material previously used, is about the same as that of paper. This material is combustible, but is not readily inflammable in the sense in which I use this expression herein and in the appended claims. If one edge of a cellophane covering is lighted, the flame quickly dies out, and the covering does not burn off but must be peeled or stripped from the adhesive coated surface of the patch as above described.

Collodion, however, is an example of a readily inflammable covering. If one edge, or any portion of this covering 14, is lighted, for example, with a match, as shown at 15 in Figure 2, the covering 14 immediately bursts into flame and burns off of the adhesive coated surface 12 of the patch 7 and leaves this surface 12 exposed for attachment of the patch to the inner surface of the tire casing 6. The covering 14 is thus removed quickly and expeditiously in this manner, and at the same time the heat which is produced in burning off this covering heats the adhesive coating 12 and brings it to a highly tacky condition for adhesion to the tire casing 6. And, furthermore, the burning off of this covering 14 is not accompanied by an undesirable ash or residue.

My invention essentially consists of a pneumatic tire casing patch of any suitable or preferred construction having its outer side, which contacts the inside of the tire casing when the patch is applied, coated with an adhesive or cement and covered by a readily inflammable covering which may be burned off by applying a match or other suitable flame to this covering. In the more specific aspects of the invention, the adhesive or cement is preferably the regular vulcanizing cement such as requires some heat to bring it to a good tacky condition but which has excellent adhesive properties, and the particular covering for this adhesive coating is collodion or any other readily inflammable chemical or other substance applied by spraying or painting it over the adhesive coated surface of the patch, or in sheet form, or otherwise as suitable or desired.

I claim:

1. A blow-out patch for tire casings comprising a patch body having a surface for attachment to a tire casing, an adhesive coating on said surface, and a protective covering for said coating, said covering being readily inflammable and of a character to burn off without objectionable ash or residue upon application of a flame thereto.

2. A blow-out patch for tire casings comprising a patch body having a surface for attachment to a tire casing, an adhesive coating on said surface, and a covering of collodion over said coating.

3. A blow-out patch for tire casings comprising a patch body having a surface for attachment to a tire casing, an adhesive coating on said surface, said coating consisting of a regular vulcanizing cement such as requires at least some heat to bring it to the desired tacky condition, and a covering of collodion over said coating.

4. A blow-out patch for tire casings comprising a patch body having a surface for attachment to a tire casing, an adhesive coating on said surface, and an actively inflammable second coating over said first coating, said second coating being of such character that a flame applied thereto will be propagated through said second coating with the inner surface thereof substantially unexposed to atmosphere.

5. A blow-out patch for tire casings comprising a patch body having a surface for attachment to a tire casing, an adhesive coating on said surface, said coating consisting of a regular vulcanizing cement such as requires at least some heat to bring it to the desired tacky condition, and a second coating of actively inflammable material over said first coating, said second coating being of such character that a flame applied thereto will be propagated through said second coating with the inner surface thereof substantially unexposed to atmosphere whereby to burn off said second coating and to heat said first coating upon application of a flame to said second coating.

6. The method of preparing for application to a tire casing a blow-out patch having a surface for attachment to said casing, an adhesive coating on said surface, and an actively inflammable second coating over said first coating which comprises burning off said second coating to expose said first coating and simultaneously to heat said first coating to bring it to the desired tacky condition.

CHARLES D. ECKHART.